United States Patent
Park et al.

(10) Patent No.: US 6,967,058 B2
(45) Date of Patent: Nov. 22, 2005

(54) POLYESTER MULTIFILAMENT YARN FOR RUBBER REINFORCEMENT AND METHOD OF PRODUCING THE SAME

(75) Inventors: Chan-min Park, Ulsan-kwangyeoksi (KR); Chan Park, Ulsan-kwangyeoksi (KR); Eun-lai Cho, Seoul (KR)

(73) Assignee: Hyosung Corporation, Seoul (KR)

( * ) Notice: Subject to any disclaimer, the term of this patent is extended or adjusted under 35 U.S.C. 154(b) by 0 days.

(21) Appl. No.: 11/064,299

(22) Filed: Feb. 23, 2005

(65) Prior Publication Data

US 2005/0196611 A1    Sep. 8, 2005

Related U.S. Application Data

(62) Division of application No. 10/870,115, filed on Jun. 17, 2004.

(30) Foreign Application Priority Data

Mar. 6, 2004   (KR) ............................ 2004-0015336

(51) Int. Cl.[7] ................................................ D01F 6/00
(52) U.S. Cl. ..................................... 428/364; 428/395
(58) Field of Search ................................. 428/364, 395

(56) References Cited

U.S. PATENT DOCUMENTS

| | | | |
|---|---|---|---|
| 4,751,143 A | * | 6/1988 | Gibbon et al. .............. 428/395 |
| 4,867,936 A | * | 9/1989 | Buyalos et al. .......... 264/210.6 |
| 5,518,813 A | * | 5/1996 | Leumer ....................... 428/364 |
| 5,891,567 A | * | 4/1999 | Kim et al. ................... 428/364 |
| 6,511,624 B1 | * | 1/2003 | Cho et al. ................. 264/210.7 |
| 6,511,747 B1 | * | 1/2003 | Cho et al. ................... 428/364 |
| 6,641,756 B2 | * | 11/2003 | Lee et al. ............. 252/301.6 S |

* cited by examiner

*Primary Examiner*—N. Edwards
(74) *Attorney, Agent, or Firm*—Michael J. Striker

(57) ABSTRACT

Disclosed is a method of producing a polyethylene terephthalate-based polyester fiber, including spinning polyethylene terephthalate based polyester to produce an undrawn yarn with an intrinsic viscosity of 0.83 or more and a density of 1.338 g/cm$^3$ or more, multi-stage drawing the undrawn yarn, heat-setting the drawn yarn, relaxing the heat-set yarn, and winding the relaxed yarn to produce the resulting drawn yarn with an intrinsic viscosity of 0.83 or more and a density of 1.38 to 1.3865 g/cm$^3$. Compared to a prior polyester yarn with high modulus and low shrinkage, produced according to conventional melt-spinning and drawing processes, an industrial polyester yarn with high modulus and low shrinkage according to the present invention contributes to significantly improving strength retention (tenacity of a dip cord/tenacity of a grey yarn) of the dip cord, produced by treating the polyester yarn of the present invention with an adhesive (RFL) and subsequently heat-treating the RFL-treated polyester yarn. Therefore, the polyester multifilament yarn according to the present invention is useful as a tire cord.

1 Claim, 1 Drawing Sheet

POLYESTER MULTIFILAMENT YARN FOR RUBBER REINFORCEMENT AND METHOD OF PRODUCING THE SAME

CROSS REFERENCE TO A RELATED APPLICATION

This application is a division of patent application Ser. No. 10/870,115, filed on Jun. 17, 2004.

BACKGROUND OF THE INVENTION

1. Field of the Invention

The present invention pertains to an industrial polyester multifilament yarn with high modulus and low shrinkage, which is useful as a fiber reinforcement material of a tire, and a method of producing the same. Compared to a prior industrial polyester multifilament yarn with high modulus and low shrinkage, the industrial polyester multifilament yarn according to the present invention is advantageous in that the polyester multifilament yarn, treated with an adhesive (RFL) and heat-treated in order to produce a tire cord, has excellent physical properties, including tenacity, elongation, toughness, shrinkage, and dimensional stability, even though a grey yarn of the above polyester multifilament yarn has poor tenacity, elongation, and toughness. Accordingly, the polyester multifilament yarn of the present invention is usefully applied to produce a treated cord with high modulus and tenacity, and low shrinkage.

2. Description of the Prior Art

Generally, a prior method of producing an industrial polyethylene terephthalate polyester fiber with high modulus and low shrinkage, includes a high-speed spinning step of spinning a yarn at a spinning rate of 2000 m/min or higher, a drawing step at a glass transition temperature or higher, that is, 80° C. or higher, typically 110° C. or higher according to a spin draw process, and a heat-setting step at 220° C. or higher.

An earliest method of producing an industrial polyethylene terephthalate fiber with high modulus and low shrinkage is disclosed in U.S. Pat. No. 4,101,525 (Herbert al Davis, et al.), in which a heat-setting process is conducted at 220 to 240° C. to produce the polyester fiber with crystallinity of 45 to 55%.

Heretofore, the crystallinity of 45 to 55% has been considered as one of standard physical properties of the industrial polyethylene terephthalate drawn yarn with high modulus and low shrinkage.

Meanwhile, U.S. Pat. No. 4,491,657 (Iso Saito, et al.) suggests a method of producing a polyethylene terephthalate drawn yarn, in which a heat-setting temperature is 220° C., and the polyester drawn yarn has terminal modulus of 0 to 15 g/d, thereby improving strength retention of a tire cord, produced using the above polyester drawn yarn.

Furthermore, U.S. Pat. No. 4,349,501 (Maxwell C. Hamlin, et al.) and U.S. Pat. No. 4,851,172 (Hudge H. Lowan, et al.) recite a drawing process using steam at 300° C. or higher, in which a draw point is fixed. As well, Japanese Pat. Laid-Open Publication No. Hei. 7-70819 (Masayasu Nagao, et al.) proposes a process of producing a polyester drawn yarn, in which a winding process is conducted at a spinning rate of 2500 to 6000 m/min, and an undrawn yarn with an intrinsic viscosity of 0.85 or more and a density of 1.365 g/cm$^3$ or more is subjected to a multi-stage drawing process at 100° C. or lower and a heat-setting process at 225° C. However, this patent aims to produce the polyester yarn with low shrinkage similar to rayon or vinylon, and thus, it is hardly used to produce a yarn for a tire cord having high tenacity.

Particularly, the undrawn yarn with the density of 1.365 g/cm$^3$ or more has too high crystallinity to mechanically draw. Hence, it is very difficult to produce a yarn with a high strength of 7.2 g/d or more required to produce the tire cord.

While studying on improvement of strength retention of a polyester multifilament yarn, having high strength and modulus, and low shrinkage, treated with an adhesive for rubbers (an RFL adhesive for tire cords) and then heat-treated, in a process of producing a drawn yarn using a highly oriented undrawn yarn, the present inventors found the fact that strength retention (tenacity of a heat-treated tire cord/tenacity of a grey yarn) of the tire cord, produced using a prior yarn with high tenacity, elongation, and toughness, and low terminal modulus, is relatively low. Accordingly, the present inventors reached a conclusion that in the case of a yarn for the tire cord subjected to a post-heat treating process, it is preferable to properly suppress crystallization of the yarn by heat so as to increase tenacity of a final product, produced using the above yarn, and to improve strength retention of the final product after the yarn is subjected to the post-heat treating process.

SUMMARY OF THE INVENTION

Therefore, the present invention has been made keeping in mind the above disadvantages occurring in the prior arts, and an object of the present invention is to provide a polyester multifilament yarn for rubber reinforcement with high modulus and low shrinkage, and a method of producing the same, in which when the polyester multifilament yarn is produced according to a melt-spinning process, heat of a relatively low temperature is provided to the polyester yarn, for example, a drawing temperature and a heat-set temperature are set to be relatively low, to properly suppress crystallization of the polyester yarn by heat to produce the drawn yarn with a density of 1.38 to 1.3865 g/cm$^3$. At this time, a final product (product for rubber reinforcement, such as a tire cord), produced using the polyester multifilament yarn of the present invention, has relatively high strength retention, in comparison with the case of using a prior polyester multifilament yarn with high modulus and low shrinkage generally having the density more than 1.3865 g/cm$^3$.

In order to accomplish the above object, the present invention provides a method of producing a polyester multifilament yarn for rubber reinforcement. The method includes A) melt-spinning polyester, containing 95 mole % or more ethylene terephthalate as a repeating unit, passing the spun polyester through a retarded cooling zone (heating or non-heating zone), right under a spinning nozzle, and a cooling zone, using blown air, to enable the spun polyester to be solidified to produce an undrawn yarn with an intrinsic viscosity (I.V.) of 0.83 or more and a density of 1.338 g/cm$^3$ or more while properly controlling a spinning rate and other spinning conditions, and oiling the undrawn yarn using a spin finish; and B) multi-stage drawing the undrawn yarn at relatively low drawing temperatures, preferably at 80° C. (glass transition temperature ($T_g$) of typical polyester) or lower, such that a draw ratio is 1.5 to 2.5, and heat-setting the resulting yarn using heat of an appropriate temperature, preferably at 210° C. or lower, to produce a drawn yarn, having an intrinsic viscosity of 0.83 or more, a carboxyl end group (CEG) of 20 microvalents/g or less, a density of 1.380 to 1.3865 g/cm$^3$ (preferably, 1.380 to 1.385 g/cm$^3$), and a tenacity of 7.2 g/d or more.

BRIEF DESCRIPTION OF THE DRAWINGS

The above and other objects, features and other advantages of the present invention will be more clearly understood from the following detailed description taken in conjunction with the accompanying drawing, in which.

DETAILED DESCRIPTION OF THE INVENTION

Figure 1:
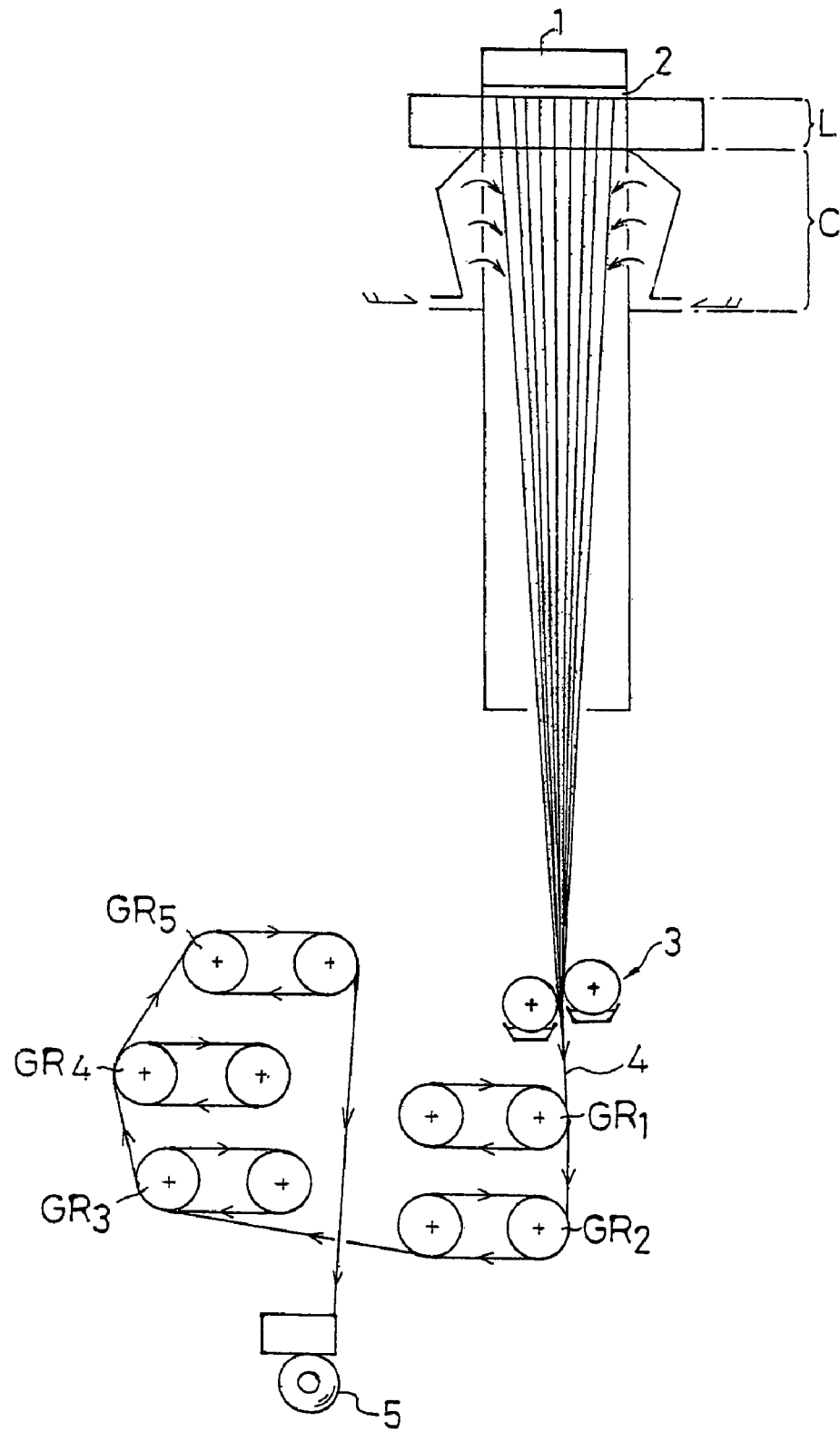
FIG. 1 schematically illustrates the production of a polyester multifilament yarn for rubber reinforcement according to the present inventions.

According to the present invention, a drawing temperature and a heat-setting temperature are set to be relatively low to produce a polyester multifilament yarn for rubber reinforcement, having a grey yarn density of 1.380 to 1.3865 g/cm$^3$.

In this regard, a typical spin finish (emulsion or neat oil) is used to produce the polyester multifilament yarn, and it is preferable to use a water-based emulsion spin finish to produce the polyester multifilament yarn, in consideration of pollution, the process control, the production costs, and stability.

A drawing process may be conducted using general godet rollers. However, the drawing process may be conducted using other kinds of godet rollers according a specific process so as to improve drawing efficiency.

For the present invention, when the drawing temperature is higher than 80° C., or the heat-setting temperature is higher than 210° C., crystallinity of a drawn yarn is increased and the drawn yarn has a density of 1.390 g/cm$^3$ or more, leading to undesirably significant reduction of strength retention of a treated cord, produced using the drawn yarn.

In addition, when an intrinsic viscosity of the drawn yarn is less than 0.83, the treated cord has very lower tenacity than a grey yarn. Furthermore, when a density of an undrawn yarn is less than 1.338 g/cm$^3$, the treated cord cannot have high modulus and low shrinkage.

In case that a drawn yarn is produced using the undrawn yarn with physical properties, as describe above, (intrinsic viscosity less than 0.83 and density less than 1.338 g/cm$^3$), if the density of the drawn yarn is more than 1.3865 g/cm$^3$, the drawn yarn has better modulus and shrinkage than that of the present invention. However, when the drawn yarn is post-processed at relatively high temperatures to produce a final product, such as a tire cord, strength retention of the final product, produced using the drawn yarn with the density more than 1.3865 g/cm$^3$, is significantly lower than in the case of using the grey yarn with the density of 1.3865 g/cm$^3$ or lower.

As well, when the density of the drawn yarn is less than 1.380 g/cm$^3$, it is difficult to industrially produce a yarn with relatively high strength of 7.2 g/d or more, and it is necessary to excessively stretch the drawn yarn during a heat-treating process using an adhesive to obtain the desired strength required as a rubber reinforcement material. Accordingly, it is difficult to industrially produce the tire cord using the drawn yarn with the density less than 1.380 g/cm$^3$.

Furthermore, it is preferable that a draw ratio be 1.5 to 2.5 so as to prevent the undrawn yarn being excessively drawn. When the draw ratio is more than 2.5, the undrawn yarn is excessively drawn to significantly reduce strength retention of the final product, produced using the drawn yarn. On the other hand, when the draw ratio is less than 1.5, tenacity of the grey yarn is reduced less than 7.2 g/d, and thus, it is hardly to produce an industrial yarn with relatively high strength.

Meanwhile, the polyester multifilament yarn according to the present invention of density 1.38 to 1.3865 g/cm$^3$ has generally following physical properties: shrinkage of 4.5% or more, intrinsic viscosity of 0.83 or more, carboxyl end group of 20 microvalents/g, or less, and tenacity of 7.2 g/d or more.

Furthermore, the treated cord produced using the polyester multifilament yarn of the present invention has following physical properties: $E_{2.25}$+FS of 6.0 to 8.0%, tenacity of 6.2 to 8.0 g/d, and strength retention of 80% or more.

Compared to a prior polyester yarn with high modulus and low shrinkage, having a density more than 1.3865 g/cm$^3$, produced according to a direct spinning drawing process, the polyester multifilament yarn according to the present invention has relatively low elongation and toughness, and relatively high shrinkage and terminal modulus, if tenacity is the same. Accordingly, the polyester multifilament yarn of the present invention is poorer than the conventional polyester yarn with high modulus and low shrinkage in terms of modulus and shrinkage. However, when the polyester multifilament yarn of the present invention is subjected to a post-heat treatment process to produce the treated cord, strength retention of the treated cord according to the present invention is improved by 2% or more and the treated cord of the present invention has excellent modulus and shrinkage in comparison of a treated cord, produced using the prior polyester yarn.

In case that densities of different undrawn yarn, produced through a melt spinning process using the same raw material, are 1.338 g/cm$^3$ or more, from comparison of different drawn yarn, produced using the undrawn yarn with the same density in such a way that the different drawn yarns have the same tenacity or draw ratio, with each other, it can be seen that reduction of the density of the drawn yarn by 0.001 g/cm$^3$ brings about improvement of strength retention of the dip cord, produced using the drawn yarn, by 0.5 to 1% (refer to Table 5).

Strength retention of the treated cord according to the present invention depends on a twisting condition of the undrawn yarn, and is typically 80% or more.

The present invention breaks a commonly accepted idea that a grey yarn with relatively high tenacity, elongation, and toughness contributes to improving strength retention of a tire cord, produced by treating the grey yarn with an adhesive for rubbers (R.F.L) and heat-treating the grey yarn treated with the adhesive. In other words, the grey yarn of the present invention has relatively poor tenacity, elongation, and dimensional stability (modulus and shrinkage), but the tire cord, produced using the grey yarn of the present invention, has better tenacity, elongation, and dimensional stability than a tire cord, produced using the conventional polyester yarn (density more than 1.3865 g/cm$^3$), produced under a prior drawing condition (drawing temperature, heat-setting temperature).

Furthermore, the present invention proves the fact that an idea, in which relatively low terminal modulus of a yarn leads to increase of strength retention of a tire cord, produced using the yarn (refer to U.S. Pat. No. 4,491,657), is not always true.

The drawn yarn according to the present invention may be converted into the dip cord according to a typical process.

For instance, two plies of drawn yarns with 1000 deniers are subjected to a plying and cabling process in the twist number of 440 turns/m, based on a typical polyester cord yarn, and after the cord yarn is dipped in an adhesive liquid for rubbers (RFL liquid), it is stretched by 2.0 to 5.0% and subjected to a heat-setting process at 230 to 245° C. for 1.5 to 2.5 min to produce a treated cord.

The treated cord thusly produced (two plies of drawn yarns with 1000 deniers are subjected to a cabling and plying process in the twist number of 440 turns/m to produce the dip cord) has E2.25+FS (which is an index indicating the degree of dimensional stability) of 6.0 to 8.0% and tenacity of 6.2 to 8.0 g/d.

Having generally described this invention, a further understanding can be obtained by reference to examples and comparative examples which are provided herein for the purposes of illustration only and are not intended to be limiting unless otherwise specified. In this regard, physical properties of multifilament yarns and treated cords according to the examples and comparative examples are evaluated as follows.

1) Intrinsic Viscosity (I.V.)

0.1 g of sample was dissolved in an agent (90° C.) of phenol and 1,1,2,2-tetrachloroethane, mixed with each other in a weight ratio of 6:4, for 90 min according to an ASTM D 4603 method such that a concentration of the sample was 0.4 g/100 ml, and the resulting solution was then maintained in an Ubbelohde viscometer in a thermostatic bath at 30° C. for 10 min. Subsequently, flow time of the resulting solution was counted using the Ubbelohde viscometer and an aspirator.

Flow time of a solvent was obtained according to the same procedure as in the case of the resulting solution, and R.V. and I.V. were calculated by the following Equations 1 and 2.

$$R.V. = \text{flow time of the sample/flow time of the solvent} \qquad \text{Equation 1}$$

$$I.V. = \frac{1}{4} \times [(R.V. - 1)/C] + \frac{3}{4} \times (\ln R.V./C) \qquad \text{Equation 2}$$

wherein, C is a concentration (g/100 ml) of the sample in the solution

2) Strength and Elongation

Strength and elongation of the sample with a length of 250 mm were measured in a standard state (20° C. and relative humidity of 65%) using Instron 5565, manufactured by Instron Corp. in USA, according to an ASTM D 885 under conditions of a tensile speed of 300 mm/min and the twist number of 80 turns/m.

3) Density and Crystallinity

The density of the sample was measured using a toluene/carbon tetrachloride density gradient column at 23° C. The density gradient column was applied to a density range of 1.33 to 1.41 g/cm$^3$, and was produced according to an ASTM D 1505-03.

$$\text{Crystallinity } (\%) = \rho c/\rho \times (\rho - \rho a)/(\rho c - \rho a) \qquad \text{Equation 3}$$

wherein, $\rho$ is the density of the sample (g/cm$^3$), and $\rho c$ and $\rho a$ are densities of a crystal and a non-crystal of the sample, respectively. At this time, $\rho c$ and $\rho a$ are 1.455 and 1.335 g/cm$^3$ respectively.

4) Shrinkage

The sample was left at a temperature of 20° C. and a relative humidity of 65% under a standard state for 24 hours or more, and then an initial length ($L_o$) of the sample was measured, which had a weight corresponding to 0.1 g/d. Subsequently, the sample was treated under a tensionless state at 150° C. for 30 min with the use of a dry oven, followed by being left for 4 hours or more after the sample was removed from the dry oven. The resulting sample was weighed to measure a final length (L) thereof, thereby the shrinkage was calculated by the following Equation 4.

$$\Delta S\ (\%) = (L_0 - L)/L_0 \times 100 \qquad \text{Equation 4}$$

5) Terminal Modulus

From a strength elongation curve obtained by the strength and elongation of the sample, a maximum strain at breaking strength, which indicates maximum strength at break, was obtained, and the terminal modulus of the sample was calculated by subtracting 2.4% from the strain at breaking strength using the following Equation 5.

$$\text{Terminal modulus } (g/d) = \text{an increment of the tenacity until the maximum strength at break}/2.4 \times 100 \qquad \text{Equation 5}$$

6) Elongation at Specific Load

The elongation of the grey yarn was measured at a load corresponding to 4.5 g/d (based on 1000 deniers) from the strength elongation S—S curve, and the elongation of the dip cord (two plies of drawn yarns with 1000 deniers are subjected to a plying and cabling process to produce the treated cord) was measured at the load of 2.25 g/d.

7) Dimensional Stability ($E_{2.25}$+FS)

The dimensional stability of the treated cord is one of physical properties, relating to a side wall indentation (SWI) of a tire and a handling, and defined as the modulus at the given shrinkage. $E_{2.25}$ (elongation at 2.25 g/d)+FS (free shrinkage) is an index regarding the dimensional stability of treated cord subjected to different heat-treating processes. At this time, the lower $E_{2.25}$+FS value is, the better the dimensional stability is.

8) Strength Retention

The strength retention of the sample was calculated by substituting a tenacity value of the sample into the following Equation 6.

Strength retention (%)=(tenacity of the treated cord/tenacity of the yarn)×100     Equation 6

EXAMPLE 1

An antimony compound, acting as a polymerization catalyst, was added into monomers in such a way that an amount of antimony trioxide in a polymer was 320 ppm, and the monomers were melt-polymerized in the presence of the antimony compound to produce polyethylene terephthalate chips. At this time, the chips had an intrinsic viscosity of 1.05 and a moisture content of 20 ppm.

The chips thusly produced were melt-spun through a spinning nozzle 2 of a spinning pack 1 at 298° C. in a spinning speed of 590 g/min using an extruder such that a monofilament fineness of the resulting drawn yarn was 4.0 deniers.

Subsequently, the spun yarn passed through a retarded cooling zone (L), right under the spinning nozzle 2, and a cooling zone (C) with a length of 530 mm (using cooling air at 20° C., flowing at a speed of 0.5 m/sec) to be solidified. 15% water-based spinning finish 3 was oiled on the solidified yarn, and wound at a winding rate of 2500 m/min to produce a undrawn yarn 4. The undrawn yarn 4 was subjected to a multi-stage drawing process using godet rollers ($GR_1$ to $GR_3$), and subjected to a heat-setting process using a heat-set roller ($GR_4$). The drawn yarn was relaxed by 2.5%, and then wound to produce the resulting drawn yarn (grey yarn) 5. At this time, the resulting drawn yarn 5 had a carboxyl end group (CEG) of 16 microequivalents/g and a linear density of 1000 deniers.

Two plies of grey yarns were subjected to a cabling and plying process in the twist number of 440 turns/m to produce a cord yarn. The cord yarn thusly produced was dipped two times in an RFL liquid, stretched by 3.0 to 3.5%, and subjected to the heat-setting process at 240° C. for two minutes to produce a dip cord. In this regard, an amount of the RFL liquid attached to the dip cord was controlled to 4%.

Physical properties of the undrawn yarn, drawn yarn, and dip cord were evaluated, and the results are described in the following Tables 1, 2, and 3.

TABLE 1

| | | | | | | Quenching zone | | Spinning | | |
|---|---|---|---|---|---|---|---|---|---|---|
| | [1]Chip | | [3]Undrawn | | | | [7]Wind | speed | Undrawn yarn | |
| | I.v. | [2]Temp. | yarn I.V. | [4]dpf. | [5]Dia. | [6]Leng. | vel. | (m/min) | [8]Den. | [9]Cryst. |
| Ex. 1 | 1.05 | 298 | 0.94 | 4.0 | 270 | 530 | 0.5 | 2500 | 1.340 | 4.5 |

[1]Chip I.v.: intrinsic viscosity of the chip
[2]Temp.: temperature of spun yarn beams (° C.)
[3]Undrawn yarn I.V.: intrinsic viscosity of the undrawn yarn
[4]dpf.: denier per filament
[5]Dia.: inner diameter (mm),
[6]Leng.: length (mm)
[7]Wind vel.: wind velocity (m/sec)
[8]Den.: density (g/cm$^3$)
[9]Cryst.: crystallinity (%)

TABLE 2

| | Drawing condition | | | | | | |
|---|---|---|---|---|---|---|---|
| | Total draw ratio | Relax index | Multi-stage drawer roller | | | Heat-set roller | Relax roller |
| | ($GR_4/GR_1$ speed ratio) | 1-$GR_5/GR_4$ speed ratio) | $GR_1$ temp. (° C.) | $GR_2$ temp. (° C.) | $GR_3$ temp. (° C.) | $GR_4$ temp. (° C.) | $GR_5$ temp. (° C.) |
| Ex. 1 | 2.15 | 0.025 | 60 | 60 | 75 | 190 | 110 |

In this respect, the draw roller is used in a drawing process before a final drawing is conducted (pair roller), the heat-set roller functions to provide heat the grey yarn after the final drawing is completed, and the relax roller serves to relax the grey yarn so as to stabilize a structure of the grey yarn.

TABLE 3

| | Drawn yarn | | | | | | | | Dip cord | | | | |
|---|---|---|---|---|---|---|---|---|---|---|---|---|---|
| | ¹I.V. | ²D. | ³Cry. | ⁴Te. | ⁵E. at load | ⁶El. | ⁷Sh. | ⁸Mo. | O.P.U. (%) | ⁴Te. | ⁵E. at load | ⁶El. | ⁷Sh. | $E_{2.25}$ + FS (%) | ⁹St. Av. |
| Ex. 1 | 0.940 | 1.383 | 42.1 | 8.2 | 5.6 | 11.0 | 9.0 | 36 | 0.7 | 7.1 | 4.5 | 15.5 | 2.4 | 6.9 | 86.6 |

¹I.V.: intrinsic viscosity
²D.: density (g/cm³)
³Cry.: crystallinity (%)
⁴Te.: tenacity (g/d)
⁵E. at load: elongation at specific load (%)
⁶El.: elongation (%)
⁷Sh.: shrinkage (%)
⁸Mo.: terminal modulus (g/d)
⁹St. Av.: strength retention (%)

EXAMPLE 2 AND COMPARATIVE EXAMPLES 1 TO 4

Polyethylene terephthalate chips were produced and spun according to the same procedure as in the case of the example 1. Subsequently, the spun yarn was oiled using the same spin finish as in the case of example 1 according to the same procedure as in the case of example 1 to produce an undrawn yarn. The undrawn yarn thusly produced was drawn in conditions described in the Table 4, subjected to a heat-setting process, relaxed by 2.5%, and wound to produce the resulting drawn yarn (grey yarn). At this time, the resulting drawn yarn had a fineness of 1000 deniers and a monofilament fineness of 4.0 deniers as shown in the Table 4. Two plies of grey yarns were subjected to a cabling and plying process in the twist number of 440 turns/m to produce a cord yarn. The cord yarn was dipped twice in an RFL liquid, stretched by 3.0%, and subjected to the heat-setting process at 240° C. for two minutes to produce a treated cord. Physical properties of the grey yarn and treated cord were evaluated, and the results are described in the following Table 5.

TABLE 4

| | Drawing condition | | | | | | |
|---|---|---|---|---|---|---|---|
| | Total draw ratio | Relax index | Multi-stage drawer roller | | | Heat-set roller | Relax roller |
| | ($GR_4/GR_1$ speed ratio) | $1-GR_5/GR_4$ speed ratio) | $GR_1$ temp. (° C.) | $GR_2$ temp. (° C.) | $GR_3$ temp. (° C.) | $GR_4$ temp. (° C.) | $GR_5$ temp. (° C.) |
| Co. Ex. 1 | 2.15 | 0.025 | 60 | 90 | 120 | 200 | 110 |
| Ex. 2 | 2.15 | 0.025 | 60 | 60 | 75 | 200 | 110 |
| Co. Ex. 2 | 2.15 | 0.025 | 60 | 90 | 120 | 220 | 120 |
| Co. Ex. 3 | 2.15 | 0.025 | 60 | 60 | 75 | 220 | 120 |
| Co. Ex. 4 | 2.15 | 0.025 | 60 | 90 | 120 | 230 | 130 |

TABLE 5

| | Drawn yarn | | | | | | | | | Dip cord | | | | | |
|---|---|---|---|---|---|---|---|---|---|---|---|---|---|---|---|
| | ¹I.V. | ²D. | ³Cry. | ⁴Te. | ⁵E. at load | ⁶El. | ⁷Sh. | ⁸Mo. | O.P.U. (%) | ⁴Te. | ⁵E. at load | ⁶El. | ⁷Sh. | $E_{2.25}$ + FS (%) | ⁹St. Av. |
| Co. Ex. 1 | 0.940 | 1.389 | 47.1 | 8.4 | 5.6 | 10.5 | 8.5 | 30 | 0.7 | 6.9 | 4.5 | 15.0 | 2.7 | 7.1 | 82.1 |
| Ex. 2 | 0.940 | 1.385 | 43.8 | 8.3 | 5.7 | 11.8 | 8.0 | 25 | 0.7 | 7.1 | 4.5 | 15.0 | 2.5 | 7.0 | 85.5 |
| Co. Ex. 2 | 0.935 | 1.391 | 48.8 | 8.4 | 5.7 | 11.5 | 6.0 | 25 | 0.7 | 6.9 | 4.4 | 14.8 | 2.8 | 7.2 | 82.1 |
| Co. Ex. 3 | 0.935 | 1.391 | 48.8 | 8.4 | 5.7 | 13.0 | 5.5 | 20 | 0.7 | 6.9 | 4.4 | 14.5 | 2.8 | 7.2 | 82.1 |
| Co. Ex. 4 | 0.935 | 1.393 | 50.5 | 8.5 | 5.7 | 13.0 | 4.8 | 22 | 0.7 | 6.9 | 4.4 | 14.5 | 2.8 | 7.1 | 81.2 |

¹I.V.: intrinsic viscosity
²D.: density (g/cm³)
³Cry.: crystallinity (%)
⁴Te.: tenacity (g/d)
⁵E. at load: elongation at specific load (%)
⁶El.: elongation (%)
⁷Sh.: shrinkage (%)
⁸Mo.: terminal modulus (g/d)
⁹St. Av.: strength retention (%)

In case that densities of different undrawn yarns, produced through a melt-spinning process using the same raw material, are 1.338 g/cm$^3$ or more, from comparison of different drawn yarns, produced using the undrawn yarns with the same density in such a way that the different drawn yarns have the same tenacity or draw ratio, with each other, it can be seen that reduction of the density of the drawn yarn by 0.001 g/cm$^3$ brings about improvement of strength retention of the treated cord, produced using the drawn yarn, by 0.5 to 1%.

As apparent from the above description, in the present invention, an undrawn yarn with a density of 1.338 g/cm$^3$ or more is subjected to a multi-stage drawing process at a lower temperature than a glass transition temperature (80° C.) of polyester such that a draw ratio is 1.5 to 2.5, and then subjected to a heat-setting process to properly suppress crystallization of the yarn by heat to produce a drawn yarn with a density of 1.38 to 1.3865 g/cm$^3$.

For the present invention, when the drawn yarn is converted into a treated cord through a heat treating process, the crystallization of the yarn by heat is slowly conducted. Accordingly, the drawn yarn of the present invention is useful to produce a treated cord having high tenacity, excellent strength retention and dimensional stability, and can be used as a grey yarn for tire cords.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A polyester multifilament yarn for rubber reinforcement, produced according to the method comprising:
   A) melt-spinning polyester, containing 95 mole % or more ethylene terephthalate as a repeating unit, passing the spun polyester through a retarded cooling zone (heating or non-heating zone) and a cooling zone to enable the spun polyester to be solidified to produce an undrawn yarn with an intrinsic viscosity of 0.83 or more and a density of 1.338 g/cm$^3$ or more; and
   B) multi-stage drawing the undrawn yarn such that a draw ratio is 1.5 to 2.5, and heat-setting a resulting yarn to produce a drawn yarn with a density of 1.38 to 1.3865 g/cm$^3$ and a tenacity of 7.2 g/d or more
   and having a density of 1.38 to 1.3865 g/cm$^3$, a shrinkage of 4.5% or more, an intrinsic viscosity of 0.83 or more, a tenacity of 7.2 g/d or more, and a carboxyl end group of 20 microequivalents/g or less.

* * * * *